United States Patent
Mine et al.

(10) Patent No.: US 6,441,814 B1
(45) Date of Patent: Aug. 27, 2002

(54) IMAGE GENERATOR, IMAGE GENERATING METHOD AND IMAGE RECORDING MEDIUM

(75) Inventors: Yuichiro Mine; Kenichi Yamamoto, both of Tokyo (JP)

(73) Assignee: Kabushiki Kaisha Sega Enterprises, Tokyo (JP)

(*) Notice: Subject to any disclaimer, the term of this patent is extended or adjusted under 35 U.S.C. 154(b) by 0 days.

(21) Appl. No.: 08/945,069

(22) PCT Filed: Feb. 20, 1997

(86) PCT No.: PCT/JP97/00471
§ 371 (c)(1),
(2), (4) Date: Oct. 17, 1997

(87) PCT Pub. No.: WO97/31338
PCT Pub. Date: Aug. 28, 1997

(30) Foreign Application Priority Data

Feb. 20, 1996 (JP) .............................................. 8-032440

(51) Int. Cl.[7] .............................................. G06T 15/00
(52) U.S. Cl. ...................................................... 345/419
(58) Field of Search ................................ 345/419, 473, 345/474, 433, 441, 420, 426

(56) References Cited

U.S. PATENT DOCUMENTS

| | | | | |
|---|---|---|---|---|
| 5,261,041 A | * | 11/1993 | Susman ........................ | 345/473 |
| 5,386,507 A | * | 1/1995 | Teig et al. ................... | 345/348 |
| 5,404,426 A | * | 4/1995 | Usami et al. ................ | 345/441 |
| 5,500,925 A | * | 3/1996 | Tolson ......................... | 345/431 |
| 5,555,366 A | * | 9/1996 | Teig et al. ................... | 711/169 |
| 5,590,062 A | * | 12/1996 | Nagamitsu et al. .......... | 364/578 |
| 5,600,774 A | * | 2/1997 | Spohrer ........................ | 345/474 |
| 5,731,819 A | * | 3/1998 | Gagne et al. ................ | 345/433 |
| 5,758,046 A | * | 5/1998 | Rouet et al. ................. | 345/430 |
| 5,764,233 A | * | 6/1998 | Brinsmead et al. .......... | 345/430 |
| 5,777,619 A | * | 7/1998 | Brinsmead ................... | 345/419 |

FOREIGN PATENT DOCUMENTS

JP 6-348858 12/1994

OTHER PUBLICATIONS

Gascuel M P et al: "Dynamic Animation of Deformable Bodies" State of the Art Reports, Vienna, Sep. 2–6, 1991 No. Conf. 12, Jan. 1, 1991, p. 187–207, XP000244834.

Sakaguchi Y et al: "Party: A Numerical Calculation Method for a Dynamically Deformable Cloth Model" Systems & Computer in Japan, vol. 26 No. 8, Jul. 1, 1995, pp. 75–87, XP000527376.

Palazzy and Forsey: "A Multilevel Approach to Surface Response in Dynamically Deformable Models" Proceedings of Computer Animation, May 25–28, 1994, pp. 21–30, XP002097274.

(List continued on next page.)

Primary Examiner—Phu K. Nguyen
(74) Attorney, Agent, or Firm—Keating & Bennett, LLP

(57) ABSTRACT

An image generating apparatus displays a highly expressive display of a polyhedron representing an object made from a pliable material using only a very small computational load. The image generating device displays images of polyhedrons located in a virtual space and includes a mass point setting circuit setting mass points across an entire surface of a polyhedron, an influential force setting circuit setting influential forces acting on the mass points, a mass point position calculating circuit calculating the positional coordinates of the mass points on the basis of the influential forces set by the influential force setting circuit; and a figure generating circuit generating a figure of the polyhedron on the basis of the positional coordinates for the mass points calculated by said mass point position calculating circuit. Since the positional coordinates of mass points are calculated on the basis of influential forces which simulate the forces acting on a real planar object, it is possible to generate a figure of a polyhedron which moves like a real, pliable planar object.

32 Claims, 12 Drawing Sheets

OTHER PUBLICATIONS

Gudukbay U et al: "Animation of Deformable Models" Computer Aided Design, vol. 26 No. 12, Dec. 1, 1994, pp. 868–875, XP000500985.

Patent Abstracts of Japan vol. 098, No. 007 Mar. 31, 1998 & JP 07 057102 A (Philips Electron NV) Mar. 3, 1995.

Yoshiyuki Sakaguchi et al., "Virtual Fashion Environment Party—Method of Calculating Collision Between Clothes and Bodies in Clothes Shape Calculation", The Transactions of IEICE (1995), vol. J78–D–II, No. 3, pp. 483–491.

Yoshiyuki Sakaguchi et al. "Virtual Fashion Environment Party—Method of Forming Checks Which Satisfy Geometrical Restrictions for Bodies and Patterns", The Transactions of IEICE (1994), vol. J77–D–II, No. 11, pp. 2210–2219.

Yoshiyuki Sakaguchi et al., "Virtual Fashion Environment Party—Method of Numerical Calculation for Dynamincally Reformable Cloth", The Transactions of IEICE (1994), vol. 77–D–II, No. 11, 912–921.

Lining Sun et al., An Architectural Design of a Sports Instruction System, Department of Information Science, Faculty of Science, University of Tokyo Technical Report 89–017, Jun. 1989.

* cited by examiner

NO INFLUENTIAL FORCES BETWEEN COLUMNS $\theta > 90°$

○ : MASS POINT

◎ : MASS POINT FORMING REFERENCE POINT

IMAGE GENERATOR, IMAGE GENERATING METHOD AND IMAGE RECORDING MEDIUM

TECHNICAL FIELD

The present invention relates to a device for generating images (hereafter, called "virtual images",) in a virtually defined space (hereafter, called "virtual space"), and more particularly, to technology for providing a highly realistic representation of objects made of a pliable material which are liable to the effect of external forces, for instance, loose portions of clothing, hair, cloth, cords, sashes, and the like.

BACKGROUND ART

With the progress in computer graphics,(CG) technology, it has become possible to represent images of a virtually defined world, three-dimensionally and in real time. In the field of video game device technology, central processing units (CPU) capable of high-speed calculation and video display processors (VDP), which have been developed in recent years, are installed in game devices and this computer graphics technology is used economically and at high-speed.

In a video game device of this kind, it is necessary to move a display object quickly and freely within a virtual space, in order to change the contents of the game continuously on the basis of the user's operations. For this purpose, usually, a polyhedron is formed by dividing a display object, such as a character (person) or the like, into triangular or quadrilateral polygonal fragments, known as polygons, and the spatial positions of each of the polygons are changed simultaneously, thereby representing movement of the polyhedron, in other words, the display object. Furthermore, if specific parts or surfaces of the display object, such as the character's arms or legs, perform the same movement, then a polygon data group (polyhedron) wherein a plurality of polygons are collected is taken as a single unit, a spatial position is given for each polygon data group, and the specific parts or surfaces are moved simultaneously.

Whatever method is adopted, provided that the display object is a rigid object, an animated image can be generated with suitable illustrative quality by taking the polygons as display units.

However, if the polygons are taken as fixed display units, as in conventional video game devices, a problem arises in that the illustrative quality is insufficient when a polyhedron forming a pliable, planar display object is displayed.

A conceivable method in a case where, for example, billowing movement of a polyhedron of this kind, such as cloth or hair, is represented, is a method whereby the positional coordinates of the apexes of polygons in a virtual space are determined successively by a program each time the display screen is renewed, in other words, a method known as polygon pattern change. However, materials which are pliable and light, such as hair, or the like, change shape readily and in a complex manner under the effect of external forces. Therefore, in a situation where the state of the screen and the characters changes frequently, as in a video game, it is practically impossible to predict all the external forces which may act on a character's hair, or the like, and the corresponding movements thereof, or to run a program which can manage these movements.

A further conceivable method is to calculate spatial coordinates in a virtual space by setting up simple equations for the apexes of each polygon. However, using simple equations alone, it is difficult to incorporate into the equation the effect of gravitation on movement, and furthermore, a huge volume of calculations is involved and processing inevitably becomes slower.

DISCLOSURE OF THE INVENTION

In view of the foregoing, it is an object of the present invention to provide a game device capable of providing a highly expressive display of a polyhedron.

In other words, it is a first object of the present invention to provide an image generating device whereby a highly realistic representation of a display object consisting of a pliable material can be obtained.

It is a second object of the present invention to provide an image generating method whereby a highly realistic representation of a display object consisting of a pliable material can be obtained.

It is a third object of the present invention to provide a recording medium on which an image generating method, whereby a highly realistic representation of a display object consisting of a pliable material can be obtained, is recorded.

In an image generating device which displays images of display objects located in a virtual space, the invention according to claim 1 is an image generating device comprising: a mass point setting circuit for setting mass points on the display object; an influential force setting circuit for setting influential forces acting on the mass points; a mass point position calculating circuit for calculating the positional coordinates of the mass points on the basis of the influential forces set by the influential force setting means; and a figure generating circuit for generating a prescribed figure comprising the display object on the basis of the positional coordinates of the mass points calculated by the mass point position calculating circuit.

The invention according to claim 2 is an image generating device according to claim 1, wherein the mass point position calculating circuit takes at least one of the mass points as a reference point and calculates the positional coordinates of the mass points in order of their proximity to the reference point, starting from the reference point.

The invention according to claim 3 is an image generating device according to claim 1, wherein the influential force setting circuit sets tensile forces acting between the mass point and mass points adjacent to this mass point as influential forces acting on the mass point.

The invention according to claim 4 is an image generating device according to claim 1, wherein the influential force setting circuit sets a wind force acting on the mass point as an influential force acting on the mass point.

The invention according to claim 5 is an image generating device according to claim 1, wherein the influential force setting circuit sets the stress acting between the mass point and mass points adjacent to this mass point as an influential force acting on the mass point.

The invention according to claim 6 is an image generating device according to claim 1, wherein the influential force setting circuit sets the gravitation acting on the mass point as an influential force acting on the mass point.

The invention according to claim 7 is an image generating device according to claim 1, wherein the influential force setting circuit sets the force of inertia acting so as to maintain the distance between the mass point and a mass point adjacent to this mass point at a uniform distance, as an influential force acting on the mass point.

The invention according to claim 8 is an image generating device according to claim 7, wherein the influential force setting circuit sets the force of inertia required in order to move the mass point from the position of this mass point as calculated assuming that there is no force for maintaining the distance between the mass point and a mass point adjacent to this mass point at a uniform distance, to a position as calculated by incorporating the force, as the influential force.

The invention according to claim 9 is an image generating device according to claim 1, wherein the influential force setting circuit sets the influential forces acting between a prescribed mass point and mass points adjacent to this mass point as ineffective forces.

The invention according to claim 10 is an image generating device according to claim 1, wherein, when the displacement of the mass point is greater than a specific threshold value, the mass point position calculating circuit calculates a value obtained by multiplying the displacement by a coefficient k (0<k<1) as the displacement of this mass point.

The invention according to claim 11 is an image generating device according to claim 1, wherein the figure generating circuit generates a figure using the positional coordinates of the mass points, wherein prescribed internal angles of the polyhedron forming the display object are maintained below a prescribed value.

The invention according to claim 12 is an image generating device according to claim 1, wherein the figure generating circuit successively links adjoining mass points in one direction of the display object by means of a wire-shaped figure, and generates an overall image wherein wire-shaped figures are arranged alongside each other.

The invention according to claim 13 is an image generating device according to claim 1, wherein the figure generating circuit generates a figure of the display object by means of triangular shapes formed by setting diagonals in quadrilateral shapes comprising four mutually adjacent mass points as apexes.

The invention according to claim 14 is an image generating device according to claim 13, wherein, when any of the internal angles of the triangular shapes is equal to or greater than a prescribed angle, the figure generating circuit sets a further diagonal which is different to the diagonal forming one edge of the triangular shapes, and generates a figure of the display object by means of triangular shapes formed by the further diagonal.

In an image generating method for displaying an image of a display object located in a virtual space, the invention according to claim 15 is an image generating method comprising the steps of: setting mass points on the display object; calculating positional coordinates for the mass points on the basis of the values of influential forces acting on the mass points; and generating a prescribed figure comprising the display object on the basis of the calculated positional coordinates of the mass points.

The invention according to claim 16 is an image generating method according to claim 15, whereby, in the step of calculating positional coordinates for the mass points, at least one of the mass points is taken as a reference point, and the positional coordinates of the mass points are calculated in order of proximity to this reference point, starting from the reference point.

The invention according to claim 17 is an image generating method according to claim 15, whereby, in the step of generating the prescribed figure, a figure wherein all internal angles are less than a prescribed angle is generated.

The invention according to claim 18 is an image generating method according to claim 15, wherein the influential forces are the values of tensile forces acting between the mass point and mass points adjacent to this mass point.

The invention according to claim 19 is an image generating method according to claim 15, wherein the influential force is the value of a wind force acting on the mass point.

The invention according to claim 20 is an image generating method according to claim 15, wherein the influential force is the value of a stress acting between the mass point and a mass point adjacent to this mass point.

The invention according to claim 21 is an image generating method according to claim 15, wherein the influential force is the value of a gravitation acting on the mass point.

The invention according to claim 22 is an image generating method according to claim 15, wherein the influential force is the force acting such that the distance between the mass point and a mass point adjacent to the mass point is kept at a uniform distance.

The invention according to claim 23 is an image generating method according to claim 15, wherein the influential force is the force of inertia required in order to move the mass point from the position of this mass point as calculated assuming that there is no force for maintaining the distance between the mass point and a mass point adjacent to this mass point at a uniform distance, to a position as calculated by incorporating the force.

The invention according to claim 24 is an image generating method according to claim 15, wherein the step of calculating positional coordinates for the mass points takes the influential forces acting between a prescribed mass point and mass points adjacent to this mass point as ineffective forces.

The invention according to claim 25 is an image generating method according to claim 15, wherein, when the displacement of the mass point is greater than a specific threshold value, the step of calculating positional coordinates for the mass points takes a value obtained by multiplying the displacement by a coefficient k (0<k<1) as the displacement of this mass point.

The invention according to claim 26 is an image generating method according to claim 15, wherein the step of generating a prescribed figure generates a figure using the positional coordinates of the mass points, wherein prescribed internal angles of the polyhedron forming the display object are kept below a prescribed value.

The invention according to claim 27 is an image generating device according to claim 15, wherein the step of generating a prescribed figure successively links adjoining mass points in one direction of the display object by means of a wire-shaped figure, and generates an overall image wherein wire-shaped figures are arranged alongside each other.

The invention according to claim 28 is an image generating method according to claim 15, wherein the step of generating a prescribed figure generates a figure of the display object by means of triangular shapes formed by setting diagonals in quadrilateral shapes comprising four mutually adjacent mass points as apexes.

The invention according to claim 29 is an image generating method according to claim 28, wherein, when any of the internal angles of the triangular shapes is equal to or greater than a prescribed angle, the step of generating a prescribed figure sets a further diagonal which is different to the diagonal forming one edge of the triangular shapes, and generates a figure of the display object by means of triangular shapes formed by the further diagonal.

The invention according to claim 30 is a mechanically readable recording medium whereon programs are recorded for implementing an image generating method according to claims 15 to 29 in a computer.

BEST MODE FOR CARRYING OUT THE INVENTION

Below, a preferred mode for implementing the present invention is described with reference to the drawings.

(I) First Mode

A. Description of the Composition

Figure 1:
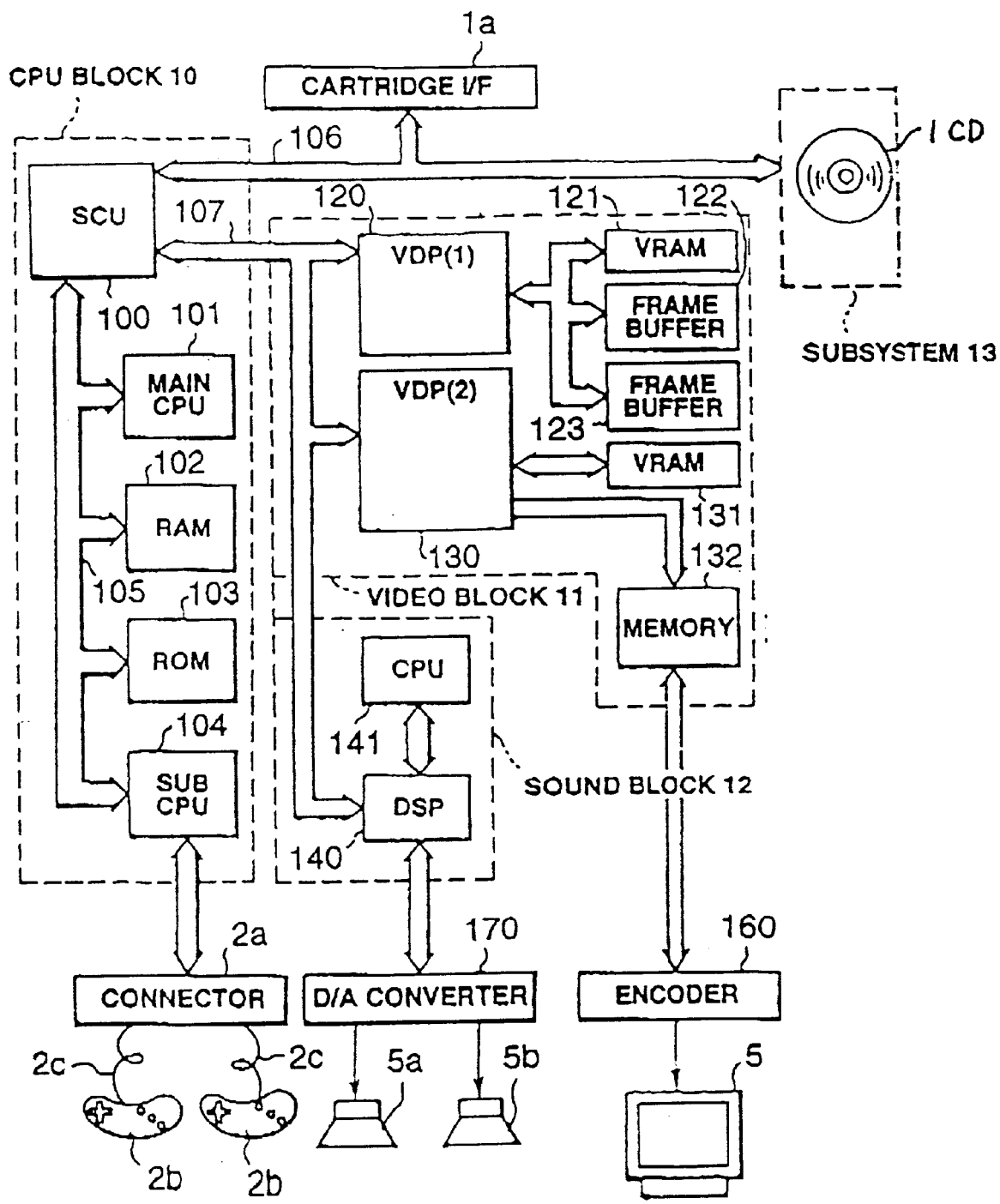
FIG. 1 is a block diagram of a mode of implementation wherein an image generating device according to the present invention is applied.

FIG. 1 shows a block diagram of a video game device according to a first mode of implementation wherein an image generating device according to the present invention is applied. In this mode of implementation, in order to display an object made of a pliable material, such as cloth, film, or the like, the effects on a mass point, including the influential forces from four adjacent mass points, are calculated for mass points located across the whole surface of a display object. Here, "influential force" may also be termed "external force" in the sense of a force acting externally on a mass point, or it may be termed "restricting force" in the sense of a force which restricts the distance of movement of the mass points.

The video game device according to the present mode comprises: a CPU block 10 which controls the whole device, a video block which controls the game screen display, a sound block 12 which generates sound effects etc., and a sub-system 13 for reading a CD-ROM, and the like.

The CPU block comprises an SCU (System Control Unit) 100, main CPU 101, RAM 102, ROM 103, sub-CPU 104, CPU bus 105, and the like. This block functions as the mass point setting circuit, influential force setting circuit, mass point position calculating circuit and (a portion of) the figure generating circuit of the present invention, by operating on the basis of program data read from the recording medium.

(Composition of the CPU Block)

The CPU block 10 comprises an SCU (System Control Unit) 100, main CPU 101, RAM 102, ROM 103, sub-CPU 104, CPU bus 105, and the like.

The main CPU 101 is provided with an internal DSP (Digital Signal Processor) and is capable of implementing computer programs at high speed. The RAM 102 records various polygon data transferred from the sub-system 13 reading the CD-ROM, and it is also used as a work area for the main CPU 101. The ROM 103 stores initial programs for initialization processing implemented when the device is in an initial state. The SCU 100 controls the transfer of data conducted between the buses 105, 106, 107. The SCU 100 is also provided with an internal DMA controller, and it transfers image data required during running of the game to a VRAM in the video block 11.

Pads 2b act as information input means for the user and are provided with various buttons required to operate the game. The sub-CPU 104 is known as an SMPC (System Manager & Peripheral Control), and it collects data (peripheral data) from the pads 2b via connectors 2a according requests from the main CPU 101. The main CPU 101 conducts processing, such as moving images shown on a display, on the basis of the peripheral data transferred from the sub-CPU 104. The sub-CPU 104 identifies the type of peripheral device connected to the connectors 2a (main unit terminals) and it collects peripheral data in accordance with a communications system corresponding to the identified type of peripheral device.

(Composition of the Video Block)

The video block 11 operates as a part of the figure generating circuit of the present invention and it comprises a VDP (Video Display Processor) 120 for generating images displayed by means of polygons, and a VDP 130 for conducting image synthesis of background screens, shadow processing, clipping, and the like. The VDP 120 is connected to a VRAM 121 and frame buffers 122, 123.

When generating images in a virtual space shown on a display, polygon data required for the image display is transferred from the main CPU 101 via the SCU 100 to the VDP 120, and it is written into the VRAM 121. The polygon data written into the VRAM 121 is stored in the picture frame buffer 122 or 123 in the forming of picture data comprising 16-bit or 8-bit colour information for each pixel. The stored picture data is transferred to the VDP 130. The main CPU 101 supplies control information for controlling picture drawing to the VDP 130 via the SCU 100. The VDP 130 processes the picture data in accordance with this control information.

The VDP 130 is connected to a VRAM 131 and it comprises a scroll function whereby the whole display screen is moved up and down, and left and right, or it is rotated, and a priority function which determines the display sequence of the polygons. The VDP 130 outputs picture data via a memory 132 to an encoder 160. The picture data output to the encoder 160 is converted to a video signal format, whereupon it is D/A converted and displayed on a monitor unit 5. Images are displayed on the monitor unit 5 on the basis of this video signal.

(Composition of Other Blocks)

The sound block 12 comprises a DSP 140 which synthesizes sound by means of a PCM system or FM system, and a CPU 141 for controlling the DSP 140, and the like. The sound data generated by the DSP 140 is converted to a two-channel signal by means of a D/A converter 170, and is then output to the speakers 5a and 5b.

The sub-system 13 is fitted with a CD-ROM drive, or the like, and performs the function of reading applicational software supplied by a recording medium, such as a CD-ROM, thereby reproducing animated images, and the like.

(Composition of Functional Blocks)

Figure 2:
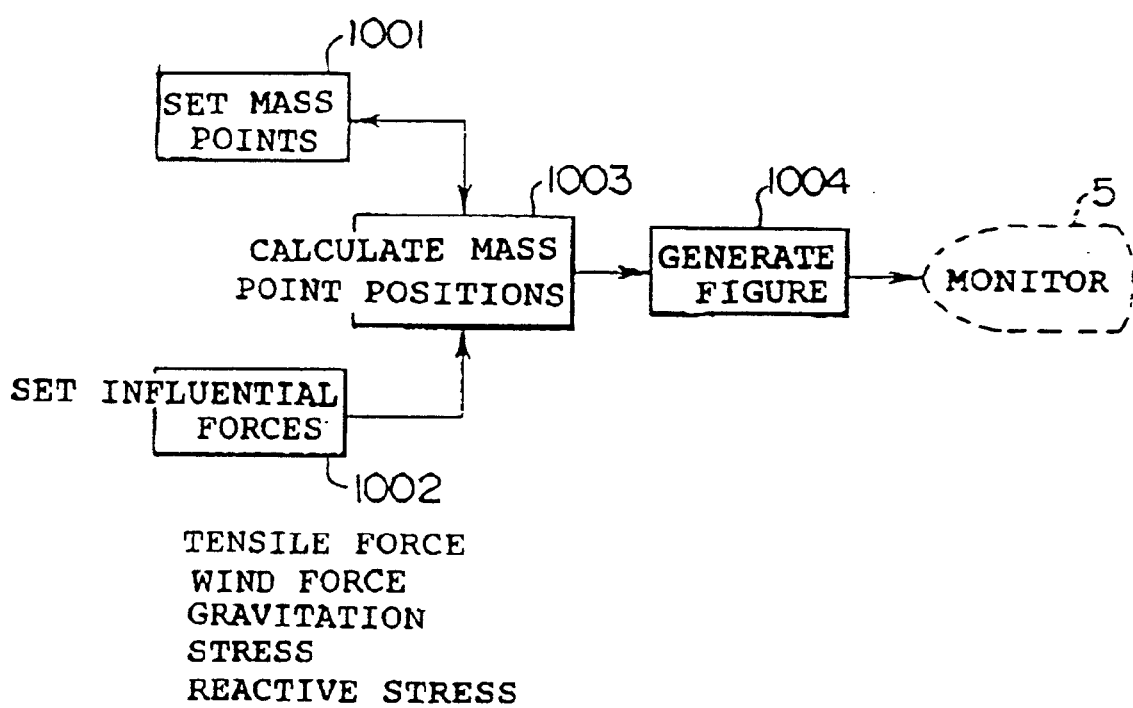
FIG. 2 is a functional block diagram in a mode for implementing the present invention.

FIG. 2 is a functional block diagram of an image generating device according to the present invention. The display object made of a pliable material, which is the displayed image in the present invention, is represented as a polyhedron comprising a plurality of polygons, and mass points are set at the apexes of these polygons.

The mass point setting circuit 1001 and the influential force setting circuit 1002 correspond to the RAM 102, wherein positional information for the mass points and details of the influential forces relating to these mass points are previously recorded via the CD-ROM. The mass point position calculating circuit 1003 corresponds principally to the CPU. The figure generating circuit 1004 corresponds to the CPU 101 and the video block 11.

The mass point setting circuit 1001 supplies positional information for mass points relating to the polyhedron. Initial values for this positional information, before any influential force acts on the mass points, is stored upon initialization. Furthermore, if a new position for a mass point is calculated by means of the mass point position calculating circuit 1003, the positional information in the mass point setting circuit 1001 is updated. The influential force setting circuit 1002 outputs the type and size of influential force. The influential force setting circuit 1002 stores the value of an influential force in cases where it is a constant, for example, wind force or gravitation, and it also stores coefficients required to calculate tensile force, force of inertia, stress, deformative stress, force of viscosity, and the like.

The mass point position calculating circuit 1003 reads positional information for a mass point that is to be calculated, and positional information for adjacent mass points required to calculate the position of this mass point, from the mass point setting circuit 1001. It then reads the value and coefficient of the influential forces relating to the mass point that is to be calculated from the influential force setting circuit 1002, and calculates new positional coordinates in a three-dimensional space for the mass point, which are stored again in the mass point setting circuit 1001. The figure generating circuit 1004 defines polygons having apex coordinates set at mass points, on the basis of positional information for mass points supplied from the mass point position calculating circuit 1003, and after applying the required texture (mapping pattern data onto the surface of the polygons), these polygons are output to the monitor 5.

B. Description of the Operation

In the present mode, the position of each mass point is calculated at each cycle of a prescribed image display timing. In other words, in the case of a video signal, the position of each mass point is calculated and polygons based on the positional coordinates of each mass point are created each time the image is updated, for instance, at each vertical synchronization period. The operation described below relates to one cycle of updating the positions of mass points.

Figure 3:
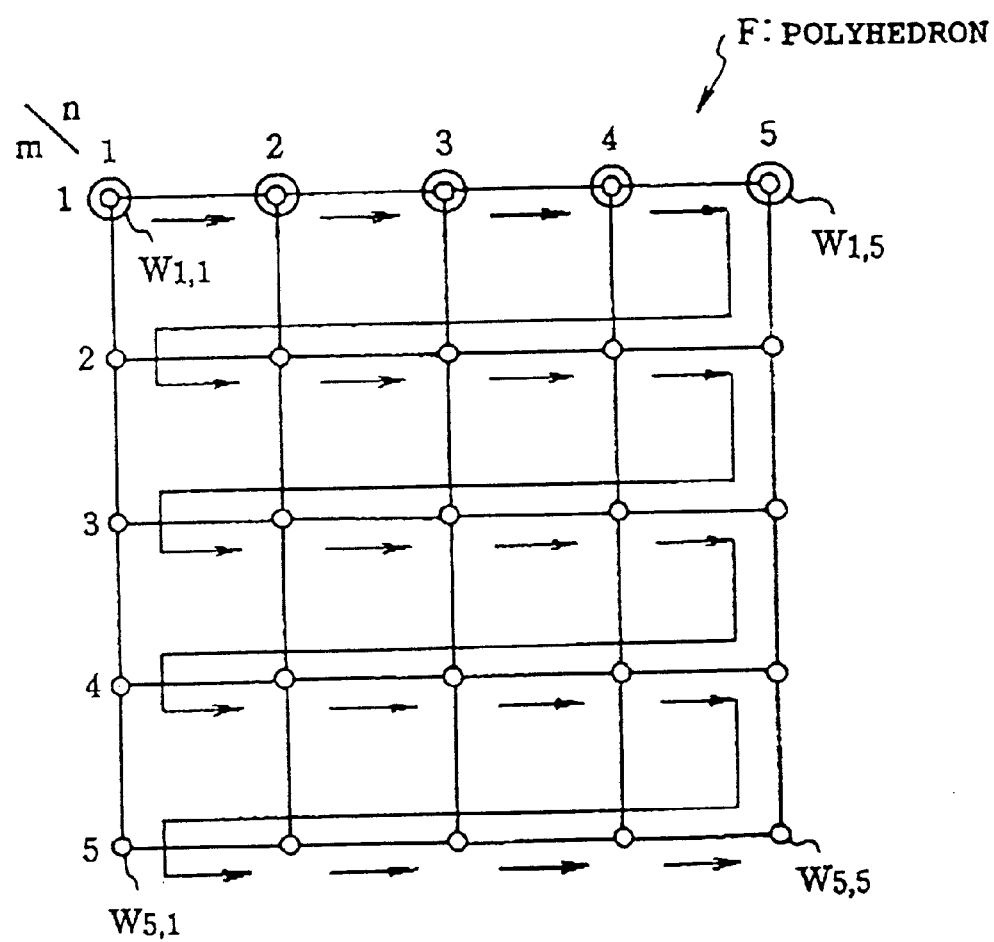
FIG. 3 is a model of a polyhedron in a first mode for implementing the present invention.

In this first mode, the influential forces exerted by four adjacent mass points (in the case of a mass point at the end portion or edge of a polyhedron, then three adjacent mass points,) are taken into account when calculating the positional coordinates of a mass point. When calculating the positional coordinates of mass points, the order in which the positions are calculated is important. If a portion of the polyhedron is fixed, then the positions of mass points in the fixed portion are determined uniformly. Therefore, it is necessary to proceed with calculation by reference to the positions of these fixed mass points, starting from the nearer mass points when viewed from these fixed mass points, and progressing successively to more distant mass points. FIG. 3 gives a corresponding illustration.

FIG. 3 is a model wherein mass points W are located on a polyhedron (cloth, sash, flag, etc.) F which is displayed as a virtual image. For the sake of simplicity, in this example, there are a total of 25 mass points located in n columns (=5) in the lateral direction and m rows (=5) in the longitudinal direction. The five mass points along the first row indicated by double circle symbols ($W1,1\_W1,5$) are mass points that are to be fixed (reference points). In this case, the positional coordinates of the mass points are calculated in the order indicated by the arrows in the diagram. The calculation is conducted in this order so that the mass point positions are determined successively starting from the mass points that are affected by the reference points, and therefore the numbers identifying the mass points are incremented for each position, in order of their proximity to the reference points.

In essence, the influential force acting on a single mass point should be calculated by incorporating the effects of the eight points surrounding it, but by setting reference points as in the present mode, and calculating in order of proximity to these reference points, it is possible to absorb errors by means of calculation involving the influential forces from four points only.

By calculating in the manner described above, it is possible to generate an image wherein the whole of the display object (polyhedron) moves with reference to a fixed edge, whatever the form of influential forces acting on the mass points. For example, if a flag is taken as the display object, then an image can be generated of a waving flag attached to a pole.

Furthermore, in the present mode of implementation, mass points are set at the positions of the apex coordinates of the polygons forming the polyhedron, namely, the display object, and this is because if mass points are set without regard to the apex coordinates, then when the mass points move and the polyhedron is recreated on the basis of the moved mass points, the number of polygons will increase or decrease, and therefore the computational load will rise.

Moreover, rather than having to set mass points for the whole display object as shown in FIG. 3, it is also possible to employ only mass points in portions where movement of an object made of a pliable material is to be created, and to apply an image generating method according to the present invention to these portions only.

Figure 4:
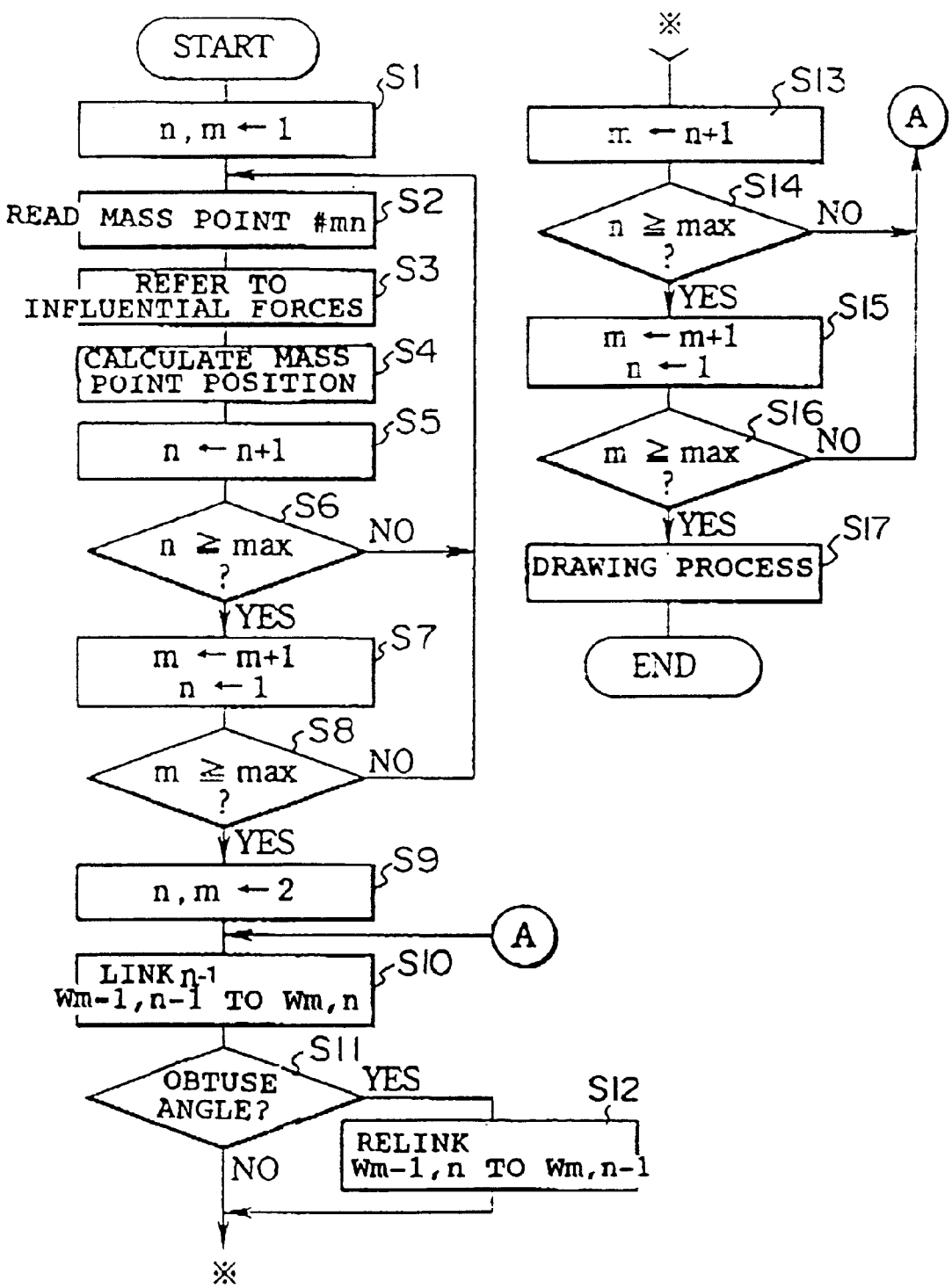
FIG. 4 is a flow-chart illustrating the operation of the first mode for implementing the present invention.

FIG. 4 shows a flowchart illustrating the operation of the present mode.

At step S1, the CPU 101 resets row m and column n to initial values. At step S2, the CPU 101 reads positional information for a mass point wm,n from the RAM 102. It then consults the influential force conditions set in the RAM 102 (step S3), and calculates the positional coordinates for the subsequent mass point (step 84).

Figure 5:
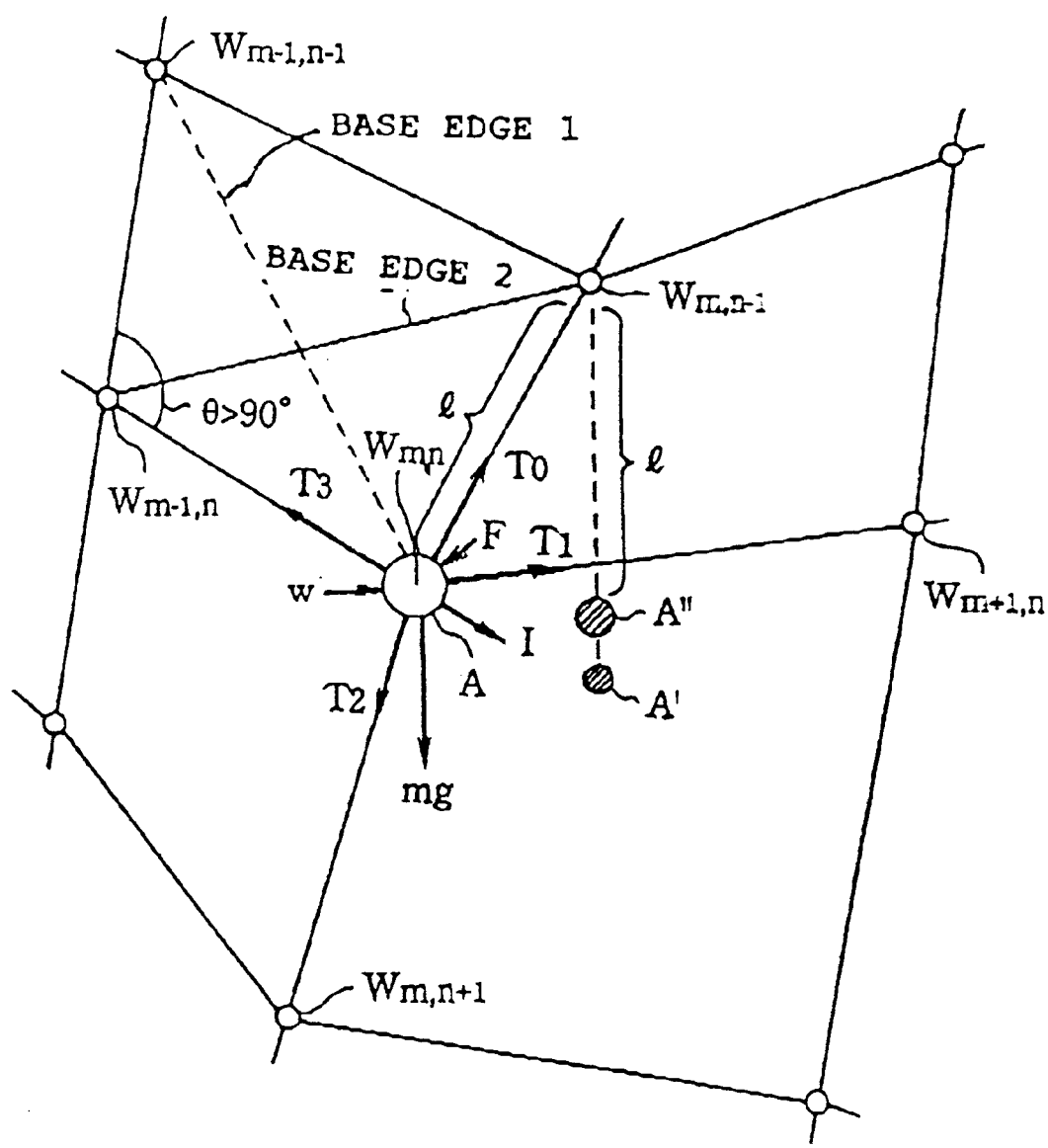
FIG. 5 is a diagram illustrating a restrictive force in the first mode for implementing the present invention.

Here, the calculation of the mass point position is described with reference to FIG. 5. This diagram illustrates influential forces acting on a particular mass point wm,n. As shown in FIG. 5, for mass point Wm,n, these comprise: the tensile forces T0_T3 from four adjacent mass points (Wm, n−1, Wm+1,n, Wm,n+1, Wm−1,n), wind force w, stress F, the force of inertia I of the mass point, and its gravitation mg (where m: mass of mass point and g: acceleration due to gravity), and the limit on the distance 1 to the adjacent mass points of these influential forces, values for the mass m, acceleration due to gravity g, wind force w, and distance 1 are determined previously by a program and stored in the RAM 102, from which they are read out during processing.

The tensile forces T may be assigned fixed values regardless of the position of adjacent mass points. Furthermore, the tensile forces may be set by multiplying the distances to adjacent mass points by a coefficient. In other words, the coefficient is taken as 1 when the distance to an adjacent mass point is 1, and when the distance increases or decreases, the coefficient also increases or decreases. In other words, when the distance is greater than 1, the tensile force is found by multiplying the original tensile force by a fixed coefficient and when the distance is less than 1, it is taken as zero.

In the case of an image where the polyhedron represents clothing, the stress F refers, for example, to the reaction force (perpendicular stress) applied to the clothing by the character's own body, by virtue of the fact that the character, or person, is wearing the clothing. Furthermore, if there is a distortion in the shape of the polyhedron, the deformative stress J (not shown in FIG. 5) generated by the change in shape of the polyhedron may also be considered. The force of inertia I is a value derived in the preceding positional calculation, as described below. Each of the influential forces is recorded in the RAM 102 with reference to the mass point.

The procedure for calculating the position of a single mass point is as follows. Firstly, the force acting on this mass point is calculated using the general formula (1)

$$f = I + T0 + T1 + T2 + T3 + m.g + F + w + J \quad (1)$$

and a new movement destination point A' is derived on this basis. Thereupon, in order to limit the distance, the final movement destination point is set at a point A" which lies on the line passing through this movement destination point A' and the mass point Wm,n−1 located above mass point Wm,n, and is at distance 1 from mass point Wm,n−1. In this case, the force moving the mass point Wm,n from its position before moving, A, to A" is stored as the force of inertia I to be used in the next calculation cycle. On the other hand, since the new mass point position has moved from A' to A", there is a change in the value of the tensile forces between the mass point at this new position A" and the adjacent mass points. The directions of the tensile forces T0_T3 acting on this new mass point position A" are calculated. The preceding description related to one cycle of the position calculating procedure for a single mass point.

When the position calculation for one mass point is completed, the column n is incremented by 1 (step S5), and if it is not equal to a maximum value (n=5) (NO), then the position of the next mass point on that row is calculated (steps S2_S5). If column n exceeds the maximum value (step S6; YES), then the line m is incremented, the column n is reset (step S7), and steps S2_S7 are repeated until the column n reaches the maximum value (m=5) (step S8; NO). By this means, it is possible to calculate the positions of all the mass points.

In step S9 onwards, polygons are created from the new mass point positions calculated above. Firstly, the initial values are set (step S9), and mass points Wm−1,n−1 and Wm,n are linked by a diagonal (step S10). In this way, two triangular shapes are created. If either of these triangular shapes contains an obtuse angle (for example, in the case of base edge 1 in FIG. 5), since the sum of the internal angles of a triangle is equal to 180°, it can be predicted that the other two internal angles will be relatively acute. If texture data is formed (applied) onto a triangular shape containing a very acute angle in this way, then texture intended to lend tangibility to the polygon will distort and this distortion will be visually perceptible. Therefore, a balanced triangle without any great differences between the sizes of its internal angles is suitable as a polygon onto which texture can be formed. Therefore, in the present mode, the balance of the triangle is determined from the size of one of the internal angles, and if it is judged that the triangle is distorted (step S11; YES), then the diagonal is redrawn and a different triangle is created. In other words, in order to change the diagonal to a different diagonal, a diagonal is drawn between mass point Wm−1,n and Wm,n−1 (base edge 2) (step 12). If there is an obtuse angle whichever diagonal is used, then the judgement may be based on the size relationship between the angles.

At step S13 and step S15, the same incrementing steps are conducted as in step S5 and step S7, respectively, and at steps S14 and S16, the same maximum value assessment is conducted as in steps S6 and S8. In other words, the polygon setting in steps S10_S12 is conducted for all the mass points.

When all the mass points have been set (step S16; YES), a drawing process is implemented (step S17). Namely, the video block 11 applies texture or the like to the defined polygons and outputs these to the monitor unit 5.

Figure 6A:
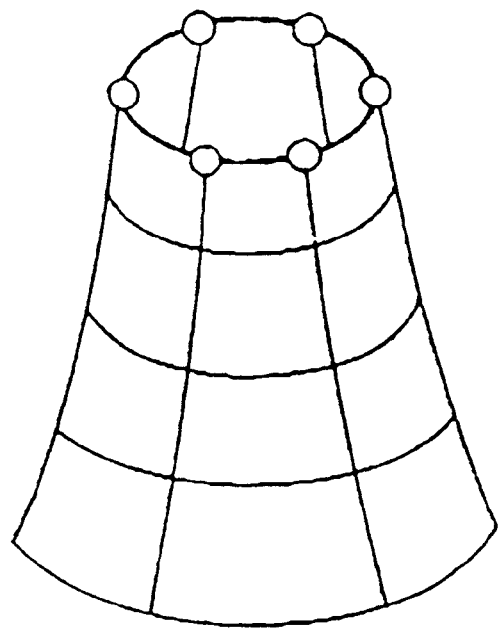
FIG. 6A is an example of a tubular polyhedron which may be applied in the first mode for implementing the present invention.
Figure 6B:
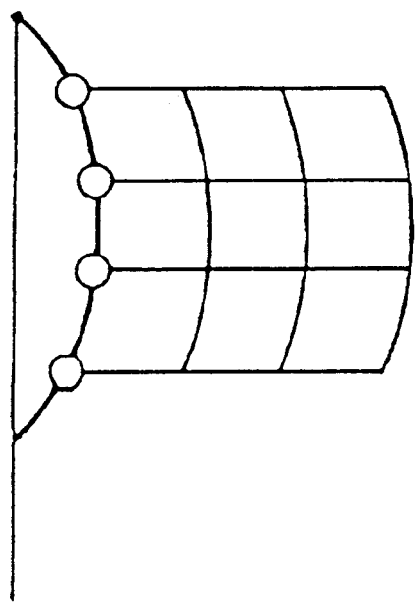
FIG. 6B is an example of a flag-shaped polygon which may be applied in the first mode of implementation.

The polyhedron in the present mode does not have to be a flat shape which is fixed completely at one end, but may also be a tubular shape as shown in FIG. 6A, or an object such as a flag as shown in FIG. 6B. In either of these cases, mass point positions are calculated in succession starting from the fixed mass point positions marked by circles.

C. Advantages of the Present Mode

The advantages of the present mode described above are as follows.

(a) since dynamic calculation assuming many external forces which might be imagined in an actual object is conducted for mass points formed across the whole surface of a polyhedron, it is possible to generate an image of natural movement which approximates the actual movement of a planar object.

(b) If the positions of the mass points forming reference points are given by a program, then the positional coordinates of mass points are calculated in order starting from the positional coordinates of the mass points nearest to the mass points forming these reference points. Therefore, if a reference point is set, or reference points are set, on a fixed point or edge of the object, it is possible to generate an image of an object made from a pliable material which moves constantly with respect the reference point(s).

(c) Since the polygons are set in a triangular shape, it is possible to set the polygons even in cases where the polyhedron is distorted and any four mass points forming a quadrilateral do not lie in the same plane.

(d) Even in cases where the polyhedron is distorted and there is deformation of the polygons, the size of the internal angles of each triangle are assessed and if it is judged that the triangle is significantly distorted, a new triangle suitable for texture mapping is set, thereby preventing the texture from having a strange appearance. It is also possible to depict natural twisting of the polyhedron.

(II) Second Mode

The second mode for implementing the present invention provides a different procedure for calculating mass points to that in the first mode described above.

The composition of the second mode is not described here, since it is the same as that of the first mode. Furthermore, since the operation of the second mode also matches that of the first mode in that it is implemented in accordance with the flowchart in FIG. 4, only those points that differ are described below.

Figure 7:
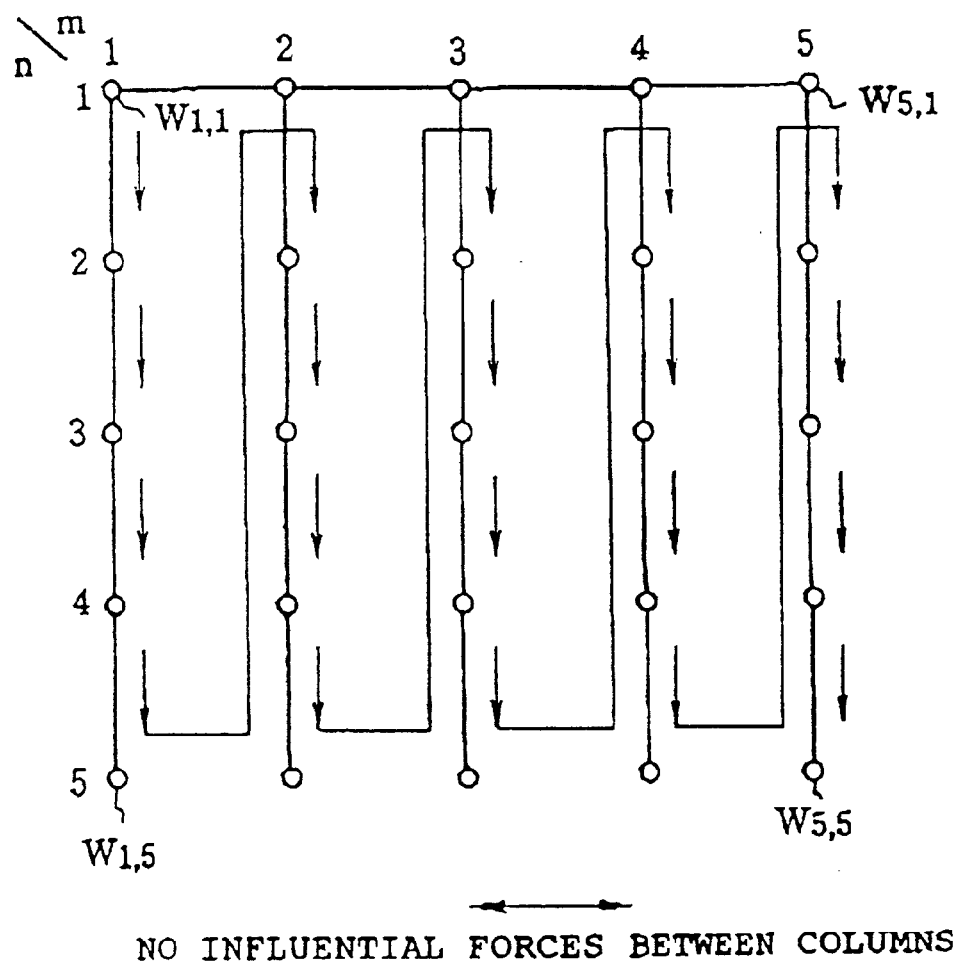
FIG. 7 is a model of an object made from a pliable material in a second mode of implementation.

FIG. 7 is a model of mass points used in the present mode. As FIG. 7 shows, no influential forces are set between neighbouring columns of mass points. In other words, whilst the mass points are connected in rows, they do not receive any influential force from neighbouring columns. In terms of FIG. 5, this means that the tensile forces T1 and T3 are not exerted, for example. Therefore, the order in which the positional coordinates of the mass points are calculated differs from the first mode of implementation and the coordinates are calculated in each column in order from the mass point forming the fixed reference point up to the end of the column (see arrow in FIG. 7). With respect to FIG. 3 in the first mode, the positions of the mass points are calculated in a sequence wherein the line number m and the column number n are reversed. Therefore, provided that the line number is taken as n and the column number is taken as m, the processing can be regarded as following the flowchart in FIG. 4. However, in the present mode, it is possible to create extreme movement of the position of the mass point at the end of each column, since no influential forces act between columns. Therefore, in the present mode, a limit is applied if the displacement between the current position of a mass point and the new position thereof as obtained on the basis of general formula (1) is greater than a prescribed value. This is now described with reference to FIG. 8.

Figure 8:
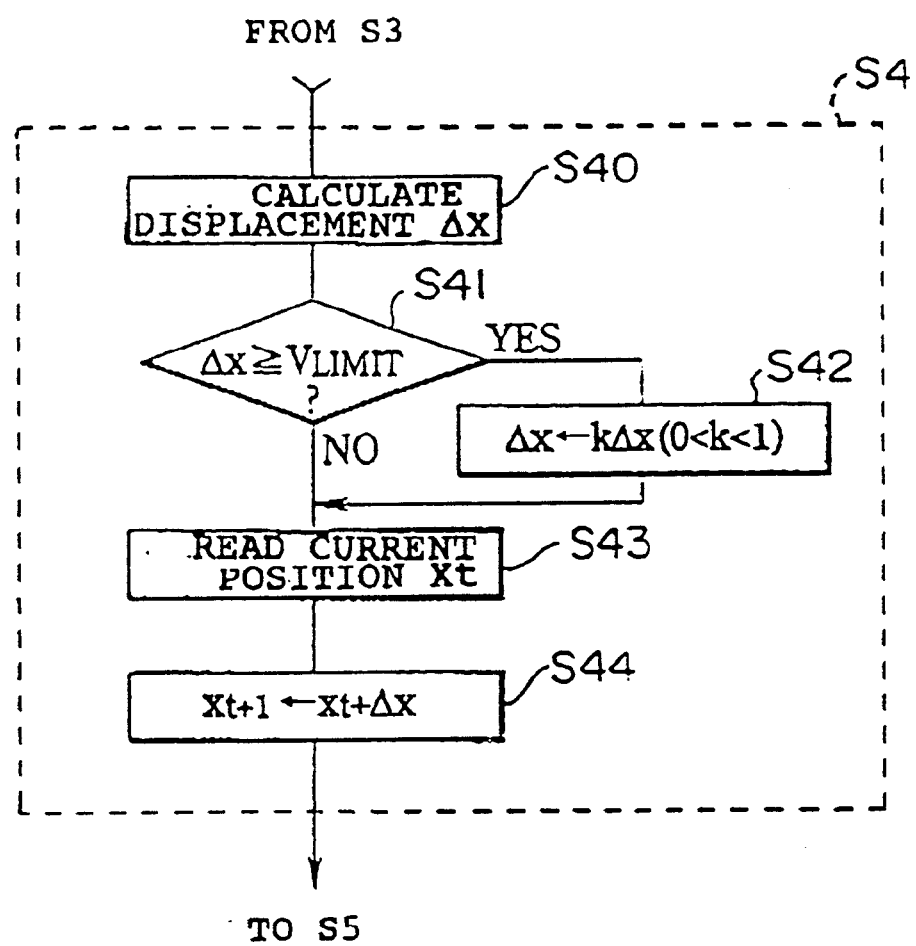
FIG. 8 is a flow-chart illustrating a part of the operation of the second mode of implementation.

FIG. 8 shows step S4 in FIG. 4 divided further into more detailed steps. Firstly, the displacement Δx to the newly calculated position of the mass point is found (step S40), and if it is greater than a prescribed threshold value $V_{LIMIT}$ (step S41; YES), the displacement is converted to a new displacement value by multiplying it by a viscosity coefficient (0<k<1) (step S42). The current position Xt is then read (step S43), and the displacement Δx is applied to give a new position, Xt+1, for the mass point. The processing described above whereby the displacement value obtained at each sample timing is multiplied by a coefficient means that a viscosity resistance corresponding to speed acts on the movement.

Figure 9A:
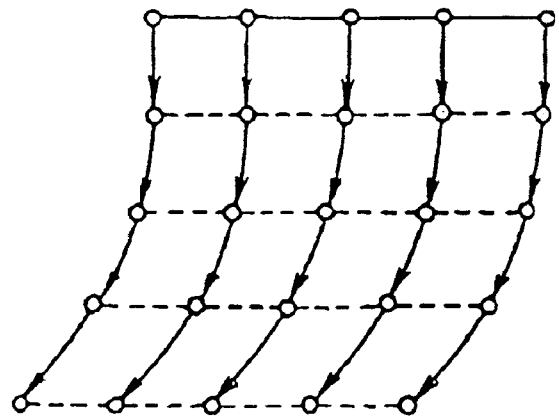
FIG. 9A is a diagram illustrating a cord-shaped polyhedron in a second mode of implementation.
Figure 9B:
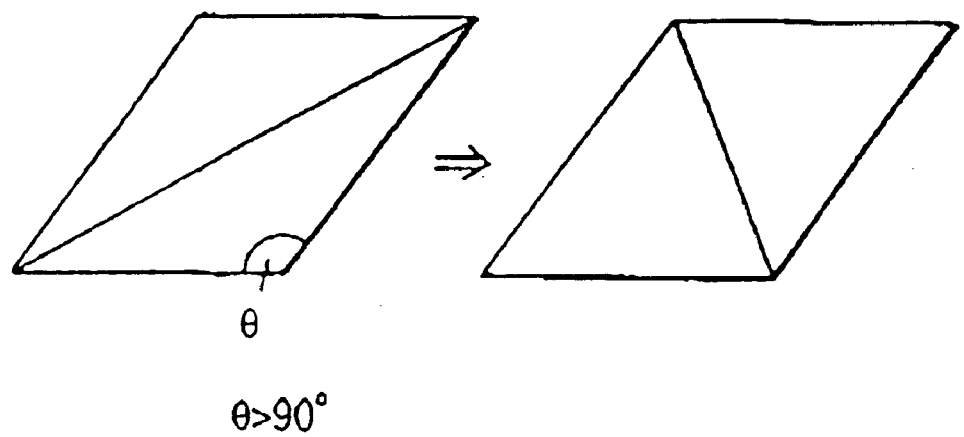
FIG. 9B is a diagram illustrating changes to a triangular figure based on the size of internal angles in a second mode of implementation.

Similarly to the first mode described above, in the present mode, triangular polygons are created by dividing quadrilateral shapes comprising four mass points as apexes by means of diagonals, (steps S9_S17). In particular, if the influential forces exerted from columns to the side are taken as ineffective, then as shown in FIG. 9A, it is often the case that the quadrilateral shapes formed by the mass points at the end portions of the object, as viewed from the reference points for positional calculation, are significantly distorted if the polyhedron oscillates. In cases of this kind, the processing described in steps S11 and S12 in FIG. 4 is implemented and since the resulting triangles contain internal angles greater than 90° (obtuse angles), new diagonals are set for the quadrilaterals and triangles containing no obtuse angles are created, as illustrated in FIG. 9B. By mapping texture onto a triangle containing no obtuse angles, it is possible to prevent the texture data from being stretched out and producing an unnatural pattern.

One advantage of the second mode described above is that the computational processing can be conducted at high speed, since no influential forces act between columns. Furthermore, since each of the columns can be assigned disparate positions, it is possible to achieve a realistic representation when generating an image wherein a plurality of cord shapes hang downwards, for instance, an image of hair or a shop curtain.

(III) Other Modes

The present invention is not limited to the modes described above, but rather may be modified in various ways.

Figure 10:
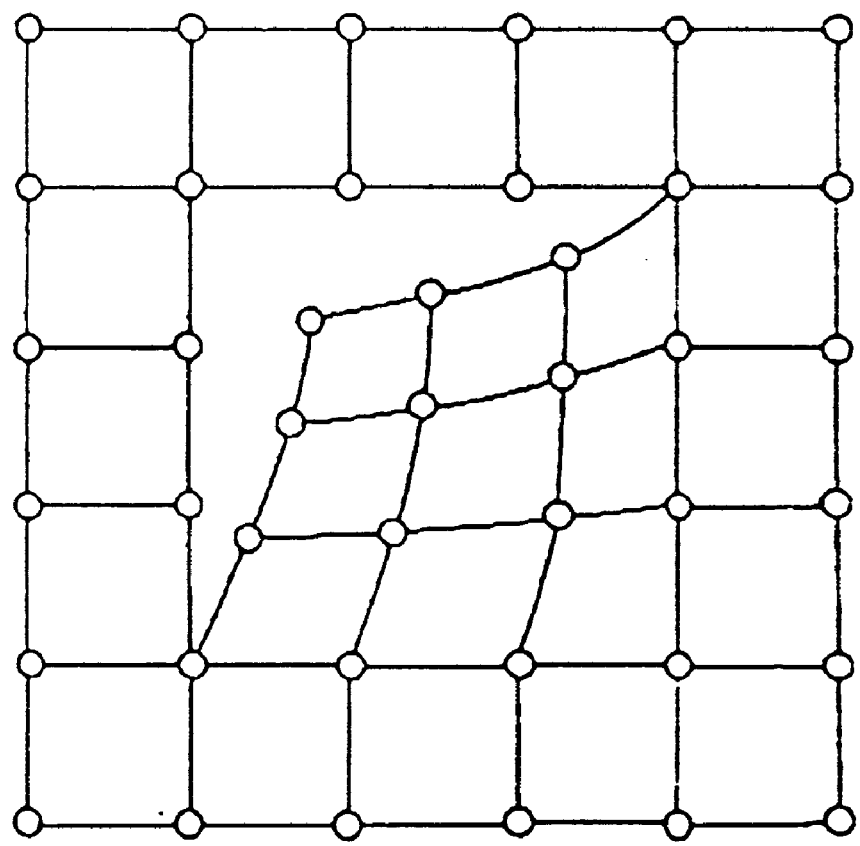
FIG. 10 is a diagram illustrating a tear in a display object which is a further modification example thereof.

For example, the influential forces in a portion of an object made from a pliable material may be taken as ineffective, as illustrated in FIG. 10. "Ineffective" means that the influential forces do not act between mass points in a certain portion of the object. Thereby, since no elastic forces or the like act to bind mass points together, a group of mass points in a lower position will be pulled by gravity and will separate from a group of mass points in a higher position. In other words, a "tear" can be represented.

Figure 11:
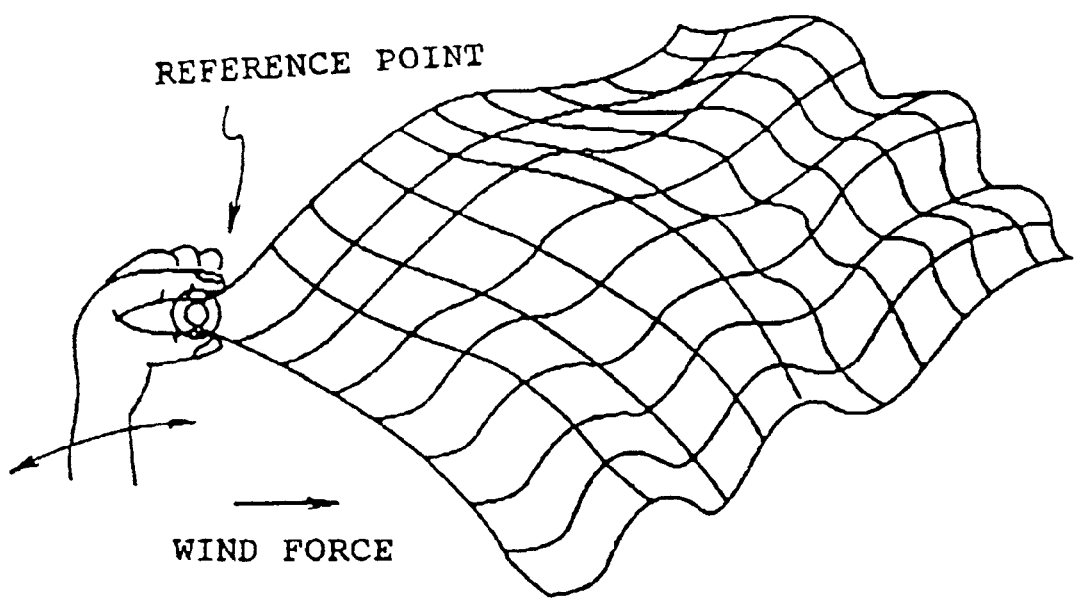
FIG. 11 is a diagram illustrating image display of a display object where a reference point is set at one point only.

Furthermore, in the modes described above, it was supposed that the fixed mass points were on the edge of the polyhedron, in other words, they were located in two or more mass point columns, but it is also possible to have only one mass point forming a reference point. For example, as shown in FIG. 11, a handkerchief could be imagined as a polyhedron having a single reference point. If one end of the handkerchief is held by someone, then only one point on the handkerchief will form a reference point. The mass point position calculating circuit 1003 calculates the positional coordinates for each of the mass points on the basis of influential forces between this mass point forming the reference point, and the other mass points.

Figure 12:
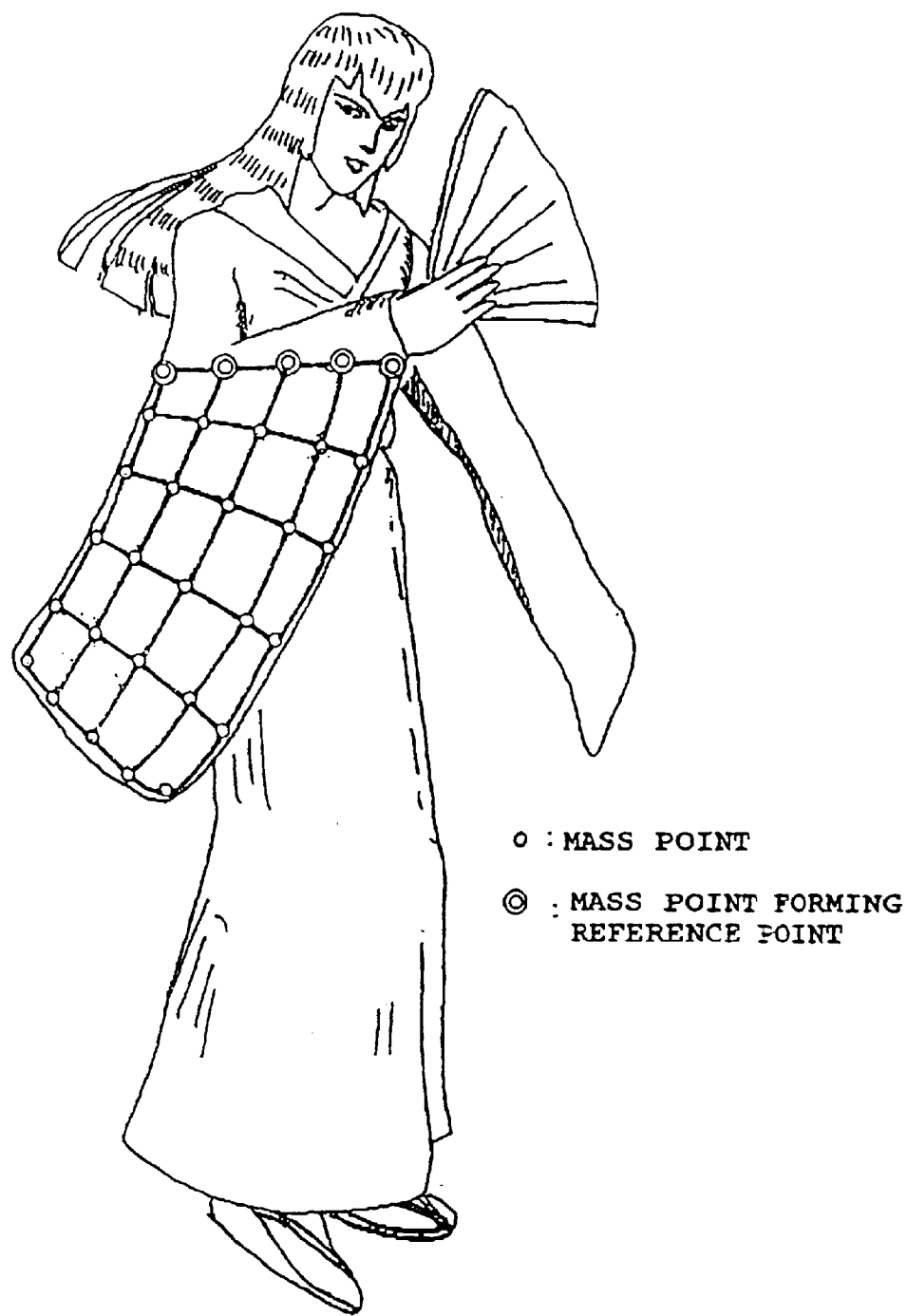
FIG. 12 is a diagram showing positions on a character display where an image generating method according to the present invention is applied.

Moreover, the present invention may also be applied in cases where the position of the mass point forming the reference point changes with each sampling timing (screen redrawing cycle). In other words, providing that, after determining the positional coordinates of a mass point forming the reference point, the positional coordinates of all the remaining mass points can be calculated within the sampling timing, then it is possible to change the positional coordinates of the mass point forming the reference point at each sampling timing. For example, if the character is a woman wearing a kimono with long sleeves, as shown in FIG. 12, then the present invention can be applied by setting mass points on the portion of the sleeve that sways, to form the display object. In this case, mass points forming reference points are set on the portion of the sleeve that does not sway, in other words, on the character's arm. If the mass points are calculated with respect to the position of reference points set on the character's arm at each sampling timing, then it is possible to generate an image of a swaying sleeve which corresponds to the movement of the character waving her arm. Besides this, it is also possible to generate an image of a polyhedron such as a fluttering petal.

Furthermore, in the modes described above, for each mass point, tensile forces acting between that mass point and four adjacent mass points are set, but elastic forces acting between the mass point and a larger number of adjacent mass points can be hypothesized. The number of mass points used in the calculating process should be set within a range allowed by the processing capacity of the device.

In a plurality of mass points, each mass point may be assigned a different gravitation.

The arrangement of the mass points may be a lattice shape, or a diamond-shaped squashed lattice, or it may be a random arrangement which is not based on any rules. Even if the mass point gravitation is changed for each mass point, and even if the mass points are set in a random arrangement, the influential force setting circuit constantly works out the gravitation of each mass point and the influential forces acting between each mass point.

The influential forces may have fixed values, or the CPU etc. may change their values according to the development of the game, or the like.

In the modes of implementation described above, the mass points were set at the apex coordinates of polygons forming the display object, but the present invention is not limited to this. For example, the mass points may be set independently of the apex coordinates of the polygon data. In this case, polygons to which texture data is applied are determined in accordance with the movement of the mass points.

INDUSTRIAL APPLICABILITY

According to the present invention, since mass points are set on a display object and realistic dynamic calculations are conducted with respect to these mass points, it is possible to provide a highly expressive display of an object within a suitable computational load. In particular, images such as waving flags, swaying sleeves on clothing, or the like, can be provided in real time.

According to the present invention, since at least one mass point is taken as a reference point for calculation, it is possible to achieve a highly expressive representation of a figure of a display object which is moving position, in order of proximity to a fixed portion thereof. For example, if elastic forces are set in a single direction, then a highly realistic representation of a thread-shaped image, for example, a cord-shaped object, the waving movement of hair, or the like, can be achieved. Moreover, if influential forces are determined by setting a single mass point only as a reference point, then a highly realistic representation of complex movements, such as a handkerchief held at one end and waved, a swaying sleeve, or a fluttering petal, or the like, can be achieved.

Since calculations are conducted in order of proximity to the reference points, in other words, in order starting from the mass points receiving the greatest influential force from the reference points, an advantage is obtained in that even if positions are calculated for a limited number of mass points, errors are not liable to occur.

According to the present invention, since the tensile forces acting between a mass point and adjacent mass points are taken as influential forces, it is possible to achieve calculation which approximates efficiently forces that act particularly strongly in an actual object.

According to the present invention, since the distance between a mass point and adjacent mass points is maintained at a constant distance, it is possible to calculate the actual behaviour of an object made from a pliable material which has no elasticity.

According to the present invention, since a wind force is caused to act on each mass point, it is possible to imitate an image, such as a flag waving in the wind.

According to the present invention, since a uniform stress is caused to act on each mass point, it is possible to stretch a display object about the shape of another object, for example, a person wearing clothing, or the like.

According to the present invention, since a gravitation is caused to act on each mass point, it is possible to imitate a hanging object, such as a cord, flag, or the like.

According to the present invention, since a force of inertia is caused to act on each mass point, it is possible to imitate the inertia of an actual object.

According to the present invention, since the influential forces between mass points in prescribed positions are taken as ineffective forces , it is possible to represent an image such as a cloth that it torn and hanging down, or the like.

According to the present invention, since the displacement of each mass point is multiplied by a coefficient, it is possible to prevent effects where, for instance, the influential force is too great and the mass point moves about suddenly.

According to the present invention, since prescribed internal angles of the polygons forming the display object are limited to a prescribed value, it is possible to generate a figure of a display object by means of a polygons which do not have a distorted shape. Therefore, a natural display is achieved when texture data is applied.

According to the present invention, since adjoining mass points are linked respectively in one direction of the display object by means of a wire-shaped figure, it is possible to display a cord-shaped image, such as hair.

According to the present invention, since a triangular shape having three mass points as apexes is taken as a display unit, it is possible to represent even an object made from a pliable material that is twisted.

According to the present invention, since the sizes of the internal angles of the triangles are assessed, and if a triangle is significantly distorted, it is replaced with a triangle which is less distorted, it is possible to select a display unit (polygon) shape which produces little texture distortion.

What is claimed is:

1. An image generating apparatus displaying images of display objects located in a virtual space, the apparatus comprising:

a mass point setting circuit for setting a plurality of mass points on said display object which mass points are spaced apart from each other by a predetermined distance set by the mass point setting circuit;

an influential force setting circuit for setting influential forces acting on said plurality of mass points;

a mass point position calculating circuit for calculating new positional coordinates for said mass points on the basis of said influential forces acting on said plurality of mass points; and a figure generating circuit for generating a prescribed figure on the basis of said new positional coordinates; wherein said mass point position calculating circuit corrects said new positional coordinates for one of said plurality of mass points when a distance between the new positional coordinates of said one of said mass points and the new positional coordinates of another of said mass points exceeds said predetermined distance set by said mass point setting circuit.

2. The image generating apparatus according to claim 1, wherein said mass point position calculating circuit uses at least one of said mass points as a reference point and calculates the new positional coordinates of remaining ones of said plurality of mass points in order of proximity to said reference point, starting from said reference point.

3. The image generating apparatus according to claim 2, wherein said influential force setting circuit sets tensile forces acting between said reference mass point and said remaining ones of said mass points adjacent to said reference mass point as influential forces acting on said plurality of mass points.

4. The image generating apparatus according to claim 2, wherein said influential force setting circuit sets a stress force acting between said reference mass point and said remaining ones of said mass points adjacent to said reference mass point as influential forces acting on said plurality of mass points.

5. The image generating apparatus according to claim 2, wherein said influential force setting circuit sets a force of inertia acting to maintain a uniform distance between said reference mass point and said remaining ones of said mass points adjacent to said reference mass point, as an influential force acting on said plurality of mass points.

6. The image generating apparatus according to claim 5, wherein said influential force setting circuit sets as said influential force a force of inertia required to move said reference mass point from a position of said reference mass point as calculated using no force to a position calculated by incorporating said force for maintaining the uniform distance between said reference mass point and each of said remaining ones of said plurality of mass points adjacent to said reference mass point.

7. The image generating apparatus according to claim 1, wherein said influential force setting circuit sets a wind force acting on said plurality of mass points.

8. The image generating apparatus according to claim 1, wherein said influential force setting circuit sets a gravitational force acting on said plurality of mass points.

9. The image generating apparatus according to claim 1, wherein said influential force setting circuit sets said influential forces acting between said one of said plurality of mass points and remaining ones of said plurality of mass points adjacent to said one of said mass points as ineffective forces.

10. The image generating apparatus according to claim 1, wherein, when a displacement of said one of said mass points is greater than a specific threshold value, said mass point position calculating circuit calculates a value obtained by multiplying said displacement by a coefficient k (0<k<1) as the displacement of said one of said mass points.

11. The image generating apparatus according to claim 1, wherein said figure generating circuit generates a figure using the new positional coordinates of said mass points, wherein internal angles of a polyhedron forming said display object are maintained below a predetermined value.

12. The image generating apparatus according to claim 1, wherein said figure generating circuit successively links adjacent ones of said plurality of mass points in one direction of said display object using a wire-outline figure, and generates a complete image by arranging a plurality of the wire-outline figures next to each other.

13. The image generating apparatus according to claim 1, wherein said figure generating circuit generates a figure of said display object using substantially triangular shapes defined by diagonals having substantially quadrilateral shapes each including four mutually adjacent ones of said plurality of said mass points as apexes.

14. The image generating apparatus according to claim 13, wherein, when any internal angle of said substantially triangular shapes is equal to or greater than a predetermined angle, said figure generating circuit sets a further diagonal which is different than one of said diagonals which defines one edge of said substantially triangular shapes, and generates a figure of said display object using substantially triangular shapes defined by said further diagonal.

15. A method for displaying an image of a display object located in a virtual space, the method comprising the steps of:
setting a plurality of mass points on said display object such that said mass points are spaced from each other by a predetermined distance;
setting influential forces acting on said mass points;
calculating new positional coordinates for said mass points on the basis of said influential forces acting on said mass points; and
generating a figure on the basis of said new positional coordinates; wherein
said new positional coordinates of at least one of said mass points are corrected when a distance between the new positional coordinates of said at least one of said mass points and the new positional coordinates of another of said mass points exceeds said predetermined distance set in said step of setting mass points.

16. The method according to claim 15, wherein in the step of calculating positional coordinates for said mass points, at least one of said mass points is used as a reference point, and the new positional coordinates of remaining ones of said mass points are calculated in order of proximity to said reference point, starting from said reference point.

17. The method according to claim 16, wherein said influential forces include tensile forces acting between said reference mass point and said remaining ones of said mass points adjacent to said reference mass point.

18. The method according to claim 16, wherein said influential forces include a stress acting between said reference mass point and said remaining ones of said mass points adjacent to reference said mass point.

19. The method according to claim 16, wherein said influential forces include a gravitational force acting on said plurality of mass points.

20. The method according to claim 16, wherein said influential forces include a force acting such that a uniform distance between said reference mass point and one of said remaining mass points which is adjacent to said reference mass point is maintained.

21. The method according to claim 20, wherein said influential forces include a force of inertia required to move said reference mass point from the position of said reference mass point as calculated using no force to a position as calculated by incorporating said force for maintaining a uniform distance between said reference mass point and said one of said remaining mass points adjacent to said reference mass point.

22. The method according to claim 16, wherein said step of calculating positional coordinates for said mass points uses said influential forces acting between said one of said mass points and said remaining ones of said mass points adjacent to said reference mass point as ineffective forces.

23. The method according to claim 15, wherein in the step of generating said figure, the figure is generated such that all internal angles contained in said figure are less than a predetermined angle.

24. The method according to claim 15, wherein said influential forces include wind force acting on said plurality of mass points.

25. The method according to claim 15, wherein, when displacement of one of said of said mass points is greater than a specific threshold value, said step of calculating positional coordinates uses a value obtained by multiplying said displacement by a coefficient k (0<k<1) as the displacement of said one of said mass points.

26. The method according to claim 15, wherein said step of generating a figure generates a figure using the new positional coordinates of said mass points, wherein internal angles of a polyhedron defining said display object are maintained below a predetermined value.

27. The method according to claim 15, wherein said step of generating a figure successively links adjacent ones of said mass points in one direction of said display object using a wire-outline figure, and generates an overall image wherein a plurality of said wire-outline figures are arranged next to each other.

28. The method according to claim 15, wherein said step of generating a figure generates a figure of said display object using substantially triangular shapes formed by setting a diagonal having a quadrilateral shape including four adjacent ones of said mass points as apexes.

29. The method according to claim 28, wherein, when any of internal angles of said substantially triangular shapes is equal to or greater than a predetermined angle, said step of generating a figure sets a further diagonal which is different than said diagonal which defines one edge of said substantially triangular shapes, and generates a figure of said display object using substantially triangular shapes formed by said further diagonal.

30. A game device which displays polyhedron images located in a virtual space, comprising:
- a mass point setting circuit for setting a plurality of mass points in said virtual space which are spaced apart from each other by a predetermined distance;
- an influential force setting circuit for setting influential forces acting on said mass points;
- a mass point position calculating circuit for calculating positional coordinates for said mass points on the basis of said influential forces acting on said mass points;
- correcting means for correcting said positional coordinates such that a distance between adjacent ones of said mass points is less than or equal to said predetermined distance set by said mass point setting circuit; and
- a figure generating circuit for generating a figure on the basis of said positional coordinates.

31. A method of generating images during operation of a game in which polyhedron images located in a virtual space are displayed, the method comprising the steps of:
- setting a plurality of mass points in said virtual space such that said plurality of mass points are spaced from each other by a predetermined distance;
- setting influential forces acting on said mass points;
- calculating positional coordinates for said mass points on the basis of said influential forces acting on said mass points;
- correcting said positional coordinates such that a distance between adjacent ones of said mass points is less than or equal to said predetermined distance set in said step of setting mass points; and
- generating a figure on the basis of said positional coordinates.

32. A computer readable recording medium having computer executable programs stored thereon implementing an image generating method for displaying an image of a display object located in a virtual space, wherein said method comprises the steps of:
- setting a plurality of mass points on said display object such that said plurality of mass points are spaced from each other by a predetermined distance;
- setting influential forces acting on said mass points;
- calculating new positional coordinates for said mass points on the basis of said influential forces acting on said mass points; and
- generating a figure on the basis of said new positional coordinates; wherein
- said new positional coordinates are corrected when a distance between said new positional coordinates of adjacent ones of said mass points exceeds said predetermined distance set in said step of setting mass points.

* * * * *